(12) United States Patent
Blondelet et al.

(10) Patent No.: US 8,645,027 B2
(45) Date of Patent: Feb. 4, 2014

(54) BINARY ADJUSTMENT METHOD FOR THE ANGULAR POSITION OF THE PLANE OF A MOTOR VEHICLE WHEEL

(75) Inventors: Michel Blondelet, Le Crest (FR); Alain Vaxelaire, Romagnat (FR); Christophe Pyszczek, Gerzat (FR)

(73) Assignees: Societe de Technologie Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 486 days.

(21) Appl. No.: 12/601,082

(22) PCT Filed: May 16, 2008

(86) PCT No.: PCT/FR2008/000685
§ 371 (c)(1),
(2), (4) Date: Aug. 4, 2010

(87) PCT Pub. No.: WO2008/155485
PCT Pub. Date: Dec. 24, 2008

(65) Prior Publication Data
US 2011/0040456 A1 Feb. 17, 2011

(30) Foreign Application Priority Data
May 23, 2007 (FR) ...................................... 07 03665

(51) Int. Cl.
*B60R 22/00* (2006.01)
(52) U.S. Cl.
USPC ....................................... 701/49; 280/86.751

(58) Field of Classification Search
USPC ........................................ 701/49; 280/86.751
See application file for complete search history.

(56) References Cited

U.S. PATENT DOCUMENTS

| | | | | | |
|---|---|---|---|---|---|
| 4,835,714 | A | * | 5/1989 | Sano et al. | 700/279 |
| 5,510,988 | A | * | 4/1996 | Majeed et al. | 701/37 |
| 5,559,698 | A | * | 9/1996 | Hwang | 701/36 |
| 5,570,289 | A | * | 10/1996 | Stacey et al. | 701/37 |
| 5,692,587 | A | * | 12/1997 | Fratini, Jr. | 188/266.2 |
| 5,897,130 | A | * | 4/1999 | Majeed et al. | 280/5.507 |
| 6,776,425 | B2 | * | 8/2004 | Britton | 280/86.75 |
| 7,331,589 | B2 | * | 2/2008 | Ingalls et al. | 280/86.756 |
| 2002/0163437 | A1 | * | 11/2002 | Haas | 340/671 |
| 2005/0256628 | A1 | * | 11/2005 | Salib et al. | 701/70 |

FOREIGN PATENT DOCUMENTS

| | | | |
|---|---|---|---|
| EP | 1145936 | * | 10/2001 |
| EP | 1145936 A1 | | 10/2001 |
| GB | 2373228 A | | 9/2002 |

* cited by examiner

*Primary Examiner* — Thomas Black
*Assistant Examiner* — Shardul Patel
(74) *Attorney, Agent, or Firm* — Bachman & LaPointe, P.C.

(57) ABSTRACT

A method of adjusting the angular rolling position of the plane of a motor vehicle wheel, in which the wheel is mounted on a vehicle so that the plane of the wheel can present a static angular position and a safety angular position, the method providing for the plane of the wheel to be maintained in the static angular position when the wheel is rolling and, in case of detection of at least one critical rolling parameter, for the wheel plane to be shifted to a safety angular position for a predetermined time period before the plane of the wheel is returned to the static angular position. A wheel mounting of a motor vehicle in which the method can be implemented is provided.

14 Claims, 1 Drawing Sheet

BINARY ADJUSTMENT METHOD FOR THE ANGULAR POSITION OF THE PLANE OF A MOTOR VEHICLE WHEEL

BACKGROUND

Field of the Invention

The invention relates to an adjustment method for the angular rolling position of the plane of a motor vehicle wheel, as well as a wheel mounting of a motor vehicle wherein said method can be implemented.

The invention applies in particular to the adjustment of the angular rolling position of the plane of a non-guiding wheel, as well as a rear wheel mounting of a motor vehicle on an axle.

In order to improve the dynamic behaviour of the vehicle, it is known to statically adjust the angular rolling position of the plane of the wheel, in particular by mounting said wheel in such a way that it has pinch angle and possibly a camber angle that are non-zero.

The pinch angle is defined as being the angle separating, in a horizontal plane parallel to the ground, the plane of the wheel from the median plane of the vehicle. When the front of the wheel shifts towards the interior, respectively towards the exterior, this is referred to as pinch, respectively opening. The camber angle is the angle of the wheel plane with the vertical axis, the camber being positive if the wheel leans towards the exterior of the vehicle.

However, during the rolling, the angular shift between the wheel plane and the frame of the vehicle induces a greater stress on the tyre as well as an overconsumption of fuel due to the resistance to rolling which results.

Moreover, dynamic adjustment methods of the angular rolling position of the plane of the wheel are known, wherein said adjustment is servo-controlled by conditions of rolling, in particular aiming to continuously adjust said angular position according to the dynamic rolling situation.

However, the implementation of these embodiments involves major complexity. Furthermore, entailing a function required for the dynamic behaviour of the vehicle, in particular for taking curves, the constraints for securing its operation are of utmost stringency.

SUMMARY OF THE INVENTION

The invention aims to propose an adjustment method for the angular rolling position of the plane of a motor vehicle wheel which makes it possible to improve the energy output and the safety of the dynamic behaviour of the vehicle, the implementation of said method being particularly simple mechanically as well as relative to the validation procedures specific to the functions intervening on the dynamic behaviour of said vehicle.

To this effect, according to a first aspect, the invention proposes an adjustment method for the angular rolling position of the plane of a motor vehicle wheel, wherein the wheel is mounted on said vehicle in such a way that the plane of said wheel can have a static angular position and a safety angular position, said method providing to maintain the plane of the wheel in the static angular position during the rolling of said wheel and, in the event of detection of at least one critical rolling parameter, to shift the wheel plane in a safety angular position during a predetermined time period before the returning of said plane of the wheel in the static angular position.

According to a second aspect, the invention proposes a wheel mounting of a motor vehicle by the intermediary of a wheel holder, said wheel holder being associated with said vehicle by the intermediary of at least one pivot in such a way that the plane of the wheel can have a first substantially zero pinch angle and a second non-zero pinch angle, said mounting further comprising a binary actuator for the shifting of the wheel holder in each of the pinch angles of the wheel plane, said actuator comprising a device for the control which is connected to a system for determining at least one rolling parameter, said device for the control being arranged to adjust the pinch angle by implementing such a method.

BRIEF DESCRIPTION OF THE DRAWINGS

Other objects and advantages of the invention will appear in the following description, made in reference to the annexed figure which schematically shows the mounting of a wheel holder respectively in position with a substantially zero pinch angle (FIG. 1a) and with a non-zero pinch angle (FIG. 1b).

DETAILED DESCRIPTION OF THE PREFERRED EMBODIMENT(S)

The invention relates to an adjustment method for the angular position of the plane of a motor vehicle wheel, in particular of a non-guiding rear wheel. In particular, the method can be implemented on each of the wheels of an axle.

Figure 1A:
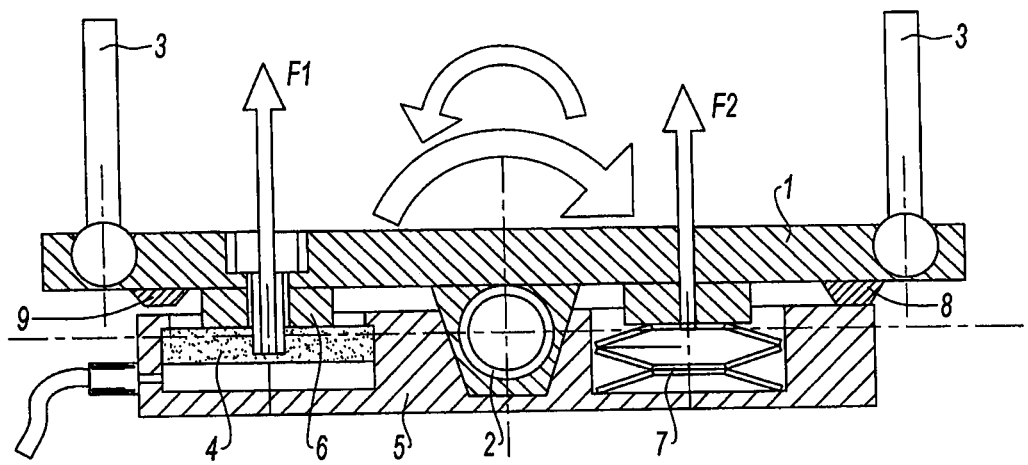
Figure 1B:
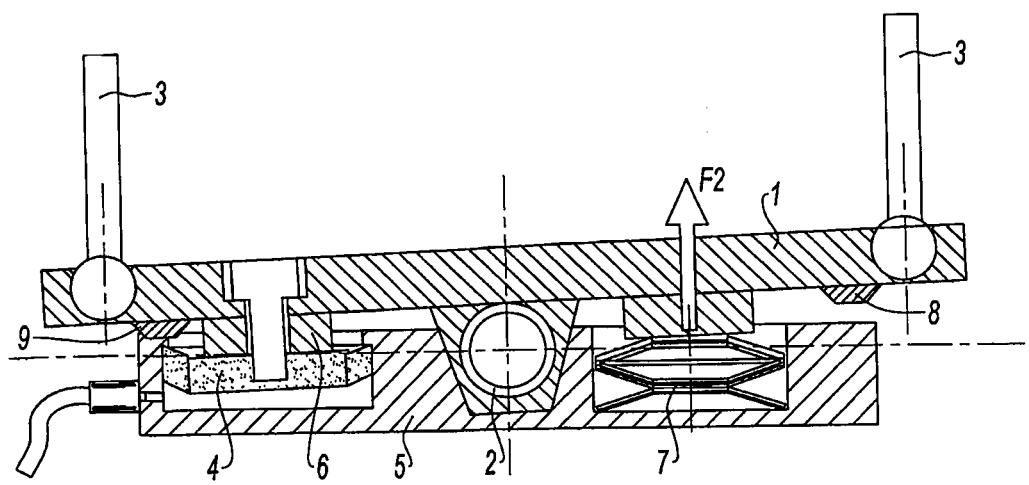

As shown in the figures, the wheel is mounted in such a way that the plane of the wheel can have two angular positions, named respectively static angular position (FIG. 1a) and safety angular position (FIG. 1b).

In an example of an embodiment, the angular rolling position is selected from among the pinch angle, the camber angle or a combination of these two angles. In particular, the static angular position can correspond to a pinch angle and/or to a camber angle substantially zero.

In examples of embodiments, the static angular position corresponds to pinch and camber angles of 0°, the safety angular position corresponding to a pinch angle less than 0.5°, in particular 0.35°, and to a zero camber angle. In this embodiment, the angular shifting of the wheel plane being less than 0.5°, the latter is not objectively perceptible by the driver. Alternatively, the pinch angle of the safety angular position can be of a magnitude of 1°, or less.

The wheel is rotatively mounted by the intermediary of a wheel holder (not shown). In the embodiment shown, the wheel holder is associated with the vehicle by the intermediary of a plate 1 carrying a central pivot 2 allowing for the arrangement of the wheel plane in the two angular positions by tilting of said plate relative to said vehicle.

In the embodiment shown which corresponds to a wheel mounting on a so-called multi-arm axle, the end of the suspension arm 3 is pivot-mounted on each of the ends of the plate 1, the other end of said arms being secured to the wheel holder in order to transmit the tilting of the plate 1 to said wheel holder. In the figures, the arms 3 are separated longitudinally in such a way as to arrange the wheel plane according to two different pinch angles, in particular a substantially zero pinch angle and a non-zero pinch angle. According to another embodiment, an axle can be provided comprising a cross member on each of the ends whereon a wheel is mounted according to the invention.

Alternatively, the arms 3 can be spaced vertically in order to arrange the wheel plane according to two different camber angles, or according to a combination of these two directions in order to arrange the wheel plane according to two combinations of pinch and camber angles. In particular, this latter embodiment can make it possible to counter camber the wheel plane when the pinch is taken.

The wheel mounting further comprises a binary actuator for the shifting of the wheel holder in each of the pinch angles of the wheel plane. The actuator shown comprises a cylinder 4, for example hydro-elastic, which is provided between a support 5 secured to the vehicle and the plate 1. More precisely, the cylinder 4 comprises an actuating member 6 of the plate 1 by tilting around the pivot 2, said member being associated with the vicinity of a first end of the plate 1, in particular between an arm 3 and the pivot 2. The support can be secured to the shell of the vehicle or to an underframe in order to facilitate the assembly of the vehicle and better filter the vibrations.

The actuator further comprises, opposite the cylinder 4 in relation to pivot 2, a spring 7 which is mounted loaded between the support 5 and the plate 1. Moreover, in order to define the travel of tilting of the plate 1 relative to the support 5, said plate comprises thrust bearings 8, 9 in contact with the support 5 in respectively a position of tilting.

As such, when the cylinder is pressurized, it exerts a force F1 which is greater than the force F2 exerted by the spring 7, in such a way as to tilt the plate 1 in order to arrange it substantially longitudinally (FIG. 1a) with a thrust bearing 8 pressing against the support 5. In the embodiment shown, this arrangement corresponds to a substantially zero pinch angle. Furthermore, in this position, the spring 7 is preloaded by bringing together plate 1 towards the support 5.

In the event of deactivation of the cylinder 4, the force F1 becomes less than the force F2 in such a way as to induce the tilting of the plate 1 in the second position with the other thrust bearing 9 resting against the support 5 (FIG. 1b). This position corresponds to a non-zero pinch angle for the wheel plane. In this embodiment, in the event of a malfunction of the cylinder 4, the plate 1 is positioned in the position in FIG. 1b, which corresponds to a non-zero pinch angle.

The adjustment method according to the invention is described hereinbelow which provides to maintain the wheel plane in the static angular position during the rolling of the wheel and, in the event of detection of at least one critical rolling parameter, to shift the wheel plane in a safety angular position during a predetermined time period before the returning of said wheel plane in the static angular position.

In the embodiment described, the shifting of the wheel between its two angular positions is carried out by the binary actuator 4, 7 which has a state of putting into static angular position and a state of putting into safety angular position. For this, the actuator 4, 7 comprises a device for the control of the cylinder 4 which is connected to a system for determining at least one rolling parameter, said device for the control being arranged to adjust the pinch angle by the implementation of the method. In particular, the system for determining can use the sensors that exist in the vehicle.

As such, it is possible to maintain the rolling with a substantially zero pinch angle, which is beneficial from a point of view concerning the wear and tear on the tyre and the induced consumption. And, in the case of rolling in a situation requiring a pinch angle, to provide this angle rapidly and this during a predetermined time period in such a way as to punctually improve the dynamic behaviour of the vehicle. Furthermore, the pinch angle is not driven according to the rolling conditions of the vehicle, which facilitates its implementation in particular relative to the validation constraints of the safety functions of the vehicle.

Furthermore, the stable state of the actuator 4, 7 described corresponds to the safety angular position of the plane of the wheel, which makes it possible to secure the dynamic behaviour of the vehicle in the event of failure of said actuator.

Moreover, the actuator 4, 7 can be arranged so that the time for placing in safety angular position is of a magnitude of a tenth of a second, which allows for rapid securing of the dynamic behaviour. And, the return time in static position can be greater than the time for placing in safety angular position, for example of a magnitude of a second and even a few dozen seconds. It is therefore possible to implement the adjustment method with simple actuators and at low energy consumption.

According to an embodiment, the time period during which the safety position is maintained can be less than 10 seconds, in particular of a magnitude of 5 seconds. Indeed, this duration is in the majority of cases sufficient to stabilise the dynamic behaviour of the vehicle.

In examples of an embodiment, the critical rolling parameter can correspond to the exceeding of a threshold value for a rolling parameter of the vehicle, said parameter able to be selected from among the lateral acceleration, the brake pressure, the rotating speed of the steering wheel.

In examples of an embodiment, the threshold value of lateral acceleration is 0.7 g, the threshold value of brake pressure is 38 bar and the threshold value of rotating speed of the steering wheel is 500°/sec. Furthermore, the critical rolling parameter can be determined according to the forward speed of the vehicle and/or of the intervention of a system for securing the dynamic behaviour of the vehicle, such as ABS or ESP.

The invention claimed is:

1. An adjustment method for the angular rolling position of a plane of a motor vehicle wheel, wherein the wheel is mounted on a vehicle in such a way that the plane of said wheel can have a static angular position and a safety angular position, said method comprising maintaining the plane of the wheel in the static angular position during rolling of said wheel and, in the event of detection of at least one critical rolling parameter, shifting the wheel plane in a safety angular position during a predetermined time period before returning said plane of the wheel to the static angular position, and
corresponding the at least one critical rolling parameter to the exceeding of a threshold value for a rolling parameter of the vehicle, said parameter being selected from among lateral acceleration, brake pressure, and rotating speed of a steering wheel.

2. The adjustment method according to claim 1, further comprising selecting the angular rolling position from among a pinch angle, a camber angle and a combination of said two angles.

3. The adjustment method according to claim 2, further comprising corresponding the static angular position to at least one of a pinch angle and a camber angle substantially null.

4. The adjustment method according to claim 1, further comprising using a time period which is less than 10 seconds as the predetermined time period, in particular of a magnitude of 5 seconds.

5. The adjustment method according to claim 1, further comprising using a time period of five seconds as the predetermined time period.

6. The adjustment method according to claim 1, further comprising carrying out the shifting of the wheel between its two angular positions by a binary actuator having a state of putting into static angular position and a state of putting into safety angular position.

7. The adjustment method according to claim 6, further comprising corresponding the stable state of the actuator to the safety angular position of the plane of the wheel.

8. The adjustment method according to claim 6, further comprising using a time for placing the wheel in said safety angular position which is of a magnitude of a tenth of a second.

9. The adjustment method according to claim 6, further comprising using a return time of the wheel plane in said static position which is greater than a time for placing in said safety angular position.

10. Wheel mounting of a motor vehicle by means of a wheel holder, said wheel holder being associated with said vehicle by means of at least one pivot in such a way that a plane of a wheel can have a first substantially zero pinch angle and a second non-zero pinch angle, said mounting further comprising a binary actuator for shifting the wheel holder in each of the pinch angles of the wheel plane, said actuator comprising a control device which is connected to a system for determining at least one rolling parameter, and said control device being arranged to adjust the pinch angle by implementation of an adjustment method for an angular rolling position of a plane of the wheel, wherein the wheel is mounted on a vehicle in such a way that the plane of said wheel can have a static angular position and a safety angular position, wherein the plane of the wheel in the static angular position is maintained during rolling of said wheel and, in the event of detection of at least one critical rolling parameter, the wheel plane is shifted into the safety angular position during a predetermined time period before returning said plane of the wheel to the static angular position, and the at least one critical rolling parameter is corresponded to the exceeding of a threshold value for a rolling parameter of the vehicle, said rolling parameter being selected from among lateral acceleration, brake pressure, and rotating speed of a steering wheel.

11. Wheel mounting according to claim 10, wherein the wheel holder is associated with the vehicle by means of a plate carrying a central pivot.

12. Wheel mounting according to claim 11, wherein the binary actuator comprises:
   a cylinder which is provided between a support and the plate, said cylinder comprising a member for actuating the plate by tilting around the pivot; and
   opposite the cylinder in relation to pivot, a spring which is mounted loaded between the support and the plate.

13. Wheel mounting according to claim 12, wherein the plate comprises two thrust bearings in contact with the support in respectively a position of tilting.

14. Wheel mounting according to claim 12, wherein the static angular position is obtained through activation of the cylinder, and the spring being preloaded in order to obtain the safety angular position in the event of deactivation of the cylinder.

* * * * *